United States Patent Office 3,306,043
Patented Feb. 28, 1967

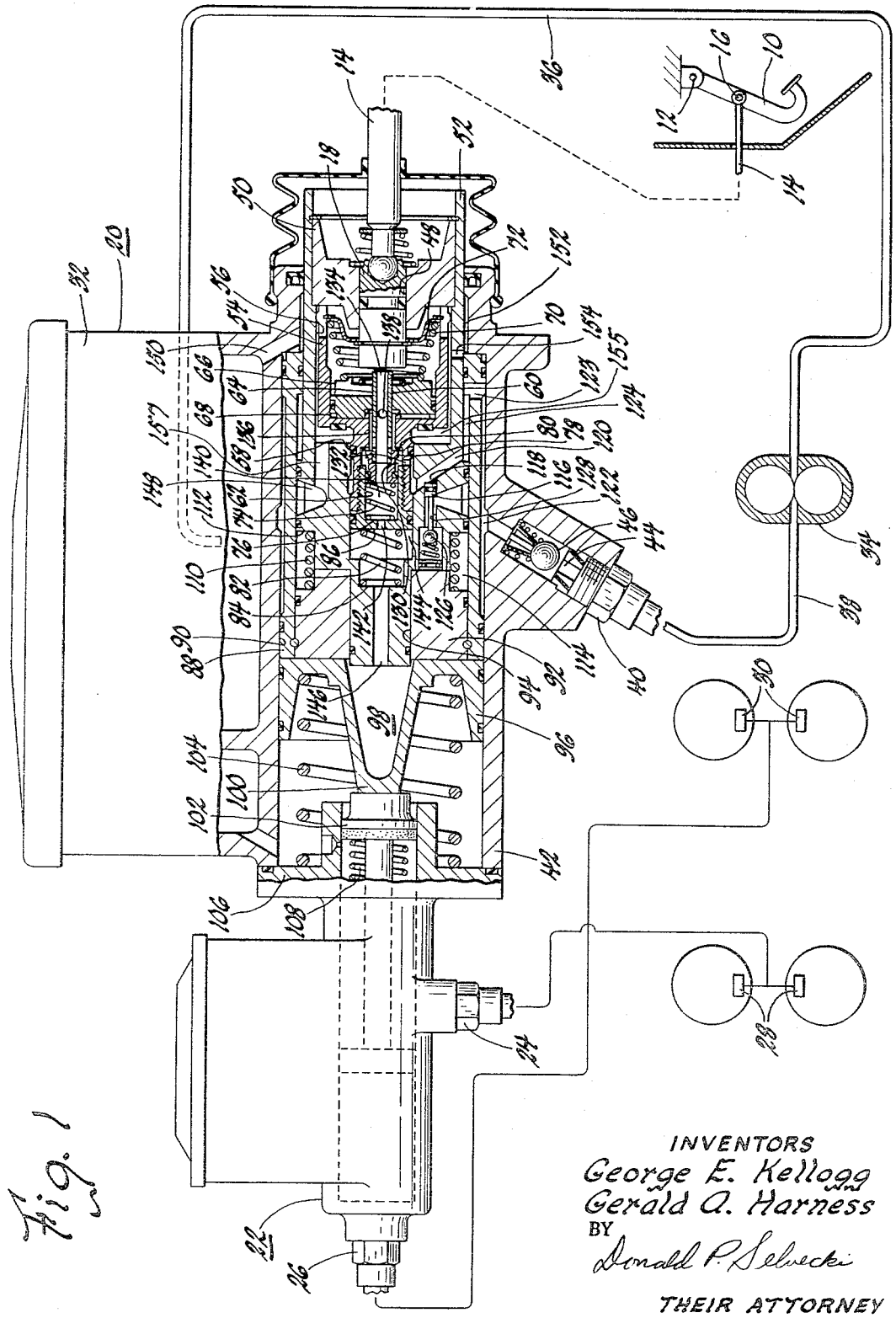

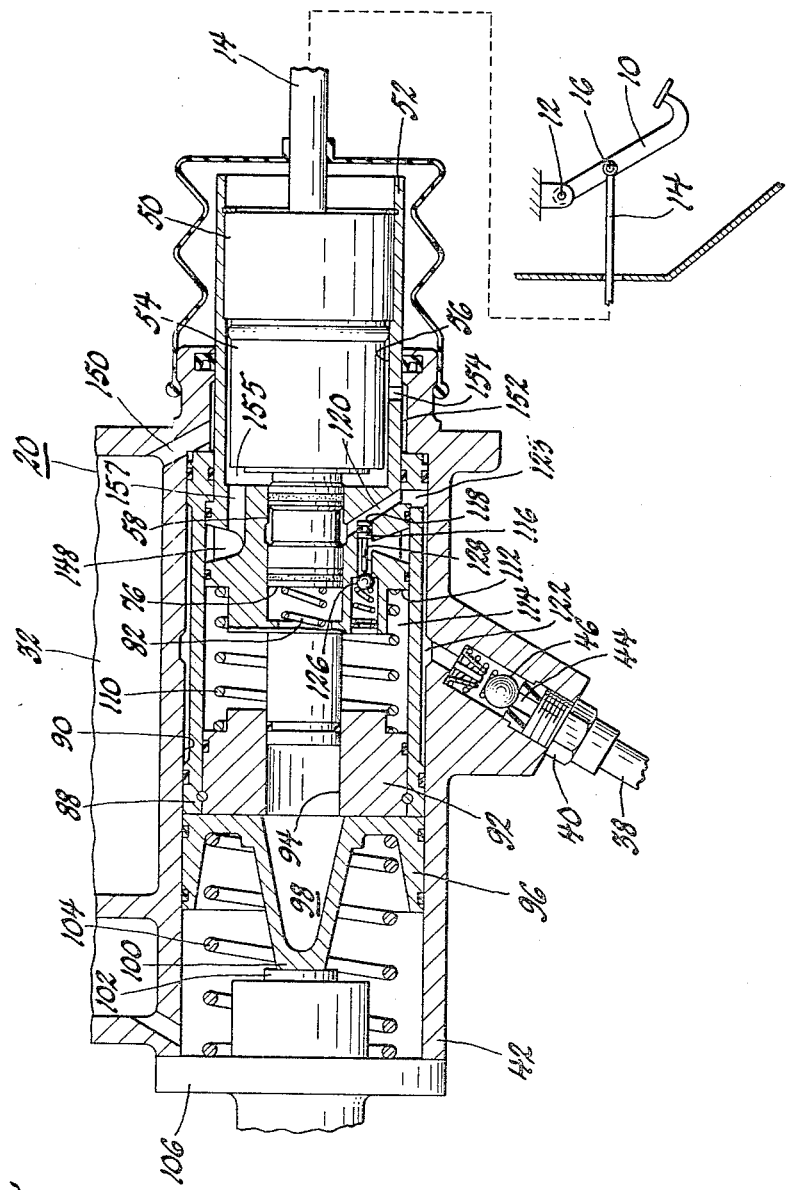

3,306,043
LOW TRAVEL HYDRAULIC BOOSTER
WITH IN-LINE LIFTER
George E. Kellogg, Miamisburg, and Gerald A. Harness, Kettering, Ohio, assignors to General Motors Corporation, Detroit, Mich., a corporation of Delaware
Filed Apr. 1, 1965, Ser. No. 444,708
10 Claims. (Cl. 60—54.5)

This invention relates to power booster mechanisms and more particularly to a power booster integrally formed with an hydraulic master cylinder sharing a common reservoir therewith and incorporating the feature of raising the brake pedal during periods of unpowered operation.

Power booster mechanisms of common design are actuatable by a brake pedal mounted in proximity to the toe board of a vehicle. However, a problem exists in this low mounting of the brake pedal relative to the toe board when a power failure occurs in the booster system and unpowered brake actuation is necessitated. This problem is caused by the lack of travel room allowed a low mounted brake pedal and by the low ratio available for movement of the pedal resulting in a high force requirement for unpowered actuation of the brakes. The subject invention has, as a feature, the capability of automatically repositioning the brake pedal thereby allowing more travel for unpowered operation and also utilizing the higher ratio becoming available to actuate brakes during unpowered conditions.

It is an object of the present invention to provide an improved brake booster mechanism which automatically raises the brake pedal in the driving compartment of a vehicle upon a power failure in a booster system.

It is another object of the present invention to provide an improved brake booster mechanism which utilizes trapped hydraulic fluid as a force transmitting link between portions of the booster mechanism during periods of unpowered operation.

It is still another object of the present invention to provide an improved brake booster mechanism which is integrally formed with an hydraulic master cylinder and which utilizes a common fluid reservoir for operation of the booster mechanism and a portion from the hydraulic master cylinder.

It is a further object of the present invention to provide an improved brake booster mechanism which transmits a force created in the booster mechanism directly to a piston for displacing fluid in the hydraulic master cylinder by utilizing a portion of the power piston.

Further objects and advantages of the present invention will be apparent from the following description, reference being had to the accompanying drawings wherein a preferred embodiment of the present invention is clearly shown.

In the drawings:

FIGURE 1 is a sectional view of the subject invention illustrated in diagrammatic sketch of a typical vehicle braking system;

FIGURE 2 illustrates the subject invention in a position it assumes for unpowered operation.

Referring now to FIGURE 1, a brake pedal 10 is pivotally supported at pivot point 12 carried in fixed relationship with respect to a vehicle and also pivotally engages an output rod 14 at pivot point 16. The output or push rod 14 drivably engages a valve actuator 18 of a brake booster, generally designated by the numeral 20. The brake booster 20 engages an hydraulic master cylinder 22 in a manner to be hereinafter described to provide a pressure at outlets 24 and 26 communicating said pressure to vehicle brakes 28 and 30, respectively. The booster 20 and the master cylinder 22 are integrally formed in the preferred embodiment, both being integrally formed with a fluid reservoir 32.

The reservoir 32 communicates with a fluid pump 34 through a line 36. The output side of the pump 34 communicates a pressure through a line 38 to an inlet means 40 of the booster 20. The inlet 40 is screwed into one wall of a booster body 42 and presents a cylindrical end 44 for engagement with a spring loaded check valve 46. The check valve 46 is loaded so as to be responsive to a predetermined pressure from the pump 34 and will automatically close off the inlet 40 when pressure from the pump 34 decreases below a certain predetermined level.

The valve actuator 18 is slidably disposed in a bore 48 formed in a plug 50 enclosing one end of a lifter body 52. A floating valve body 54 is slidably disposed in a bore 56 formed within the lifter body 52 and in a bore 58 formed within another portion of the lifter body 52. A control valve 60 is slidable in a bore 62 formed within the floating valve body 54 and is also slidable in a bore 64 formed within a reaction piston 66.

The reaction piston 66 is slidably disposed in a bore 68 of the floating valve body 54. A spring 70 biases the reaction piston 66 away from the valve actuator 18 by bearing against a spring retainer 72 carried thereby. A spring 74 bears against a wall 76 of the floating valve body 54 and against an end of the control valve 60 to maintain a portion 78 of the control valve 60 on a resilient seat 80 formed on the floating valve body 54. A spring 82 bears against a wall 84 of the lifter body 52 and a wall 86 of the floating valve body 54 to maintain a predetermined separation therebetween.

A sleeve 88 is mounted in a bore 90 in the booster body 42. The sleeve 88 is relatively fixed with respect to the bore 90 during powered operation, but slides with a piston 96 during unpowered operation of the device. Sleeve 88 is fixed and acts as a portion of the valve body 42 during powered operation, for it serves to pilot the valve mechanism. A plug 92 serves as a closure means for the portion of the booster body in which the valving takes place and provides a bore 94 in which the lifter body 52 is piloted. The power piston 96 is slidably disposed in another portion of the bore 90 and cooperates with the lifter body 52 and the plug 92 to form a pressurizable chamber 98. An end 100 of the power piston 96 can be integrally formed with a piston 102 of the master cylinder 22 or can abut said piston so as to be in driving engagement therewith. A spring 104 is compressed between a wall 106 of the booster body 42 and the power piston 96 to provide a return spring therefor. A spring 108 of the master cylinder 22 serves as a return spring for the piston 102 sometimes referred to herein as the second piston of the hydraulic master cylinder. It is understood that a piston similar to piston 102 provides a pressure build-up at outlet 26 in any well-known manner as does piston 102 at the outlet 24.

A pedal lifting means is provided for the brake booster 20 by a spring 110 compressed between plug 92 and a wall 112 of the lifter body 52. The spring 110 is disposed in a chamber 114 which houses fluid in a manner to be hereinafter described providing a direct link between the lifter body 52 when repositioned by the spring 110 and the plug 92. A piston 116 is slidable in a bore 118 of the lifter body 52 and is responsive to fluid pressure in passage 120. Passage 120 communicates with inlet 40 through passage 122 formed between sleeve 88 and a bore 90, through aperture 123 and through passage 124. Piston 116 is therefore responsive to pressure at inlet 40 and is adapted to hold check valve 126 off its seat at the end of passage 128. The chamber 114 is shown in FIG- URE 2 in an enlarged configuration that it would assume upon a pressure decrease at inlet 40.

In operation, fluid from pump 34 enters inlet 40, unseats check valve 46 and is communicated to passage 122. The fluid is communicated to passage 124 through aperture 123 and is felt at the back side of piston 116. This pressure drives piston 116 to the left, as viewed in FIGURE 1, and unseats check valve 126. Pressure is also communicated to a chamber 130 formed between control valve 60 and floating valve body 54 through aperture 132. Chamber 130 is sealed by the cooperation of portion 78 of control valve 60 and resilient seat 80. This is the normal pressure situation with the pump 34 functioning properly and during operating conditions when the brake is not actuated.

When it is desired to actuate the brake mechanism, a force is exerted on pedal 10 causing the rod 14 to move the valve actuator 18 in bore 48. Initial movement of the valve actuator 18 shuts off an open end 134 of the control valve 60. This is an exhaust port which functions in a manner to be hereinafter described. Further movement of the actuator 18 results in movement of the control valve 60 until portion 78 is moved from the seat 80. Pressure is immediately communicated to chamber 136 and through apertures 138 to the open center of the control valve 60. At the same time, pressure is immediately communicated to chamber 140 formed between the floating valve body 54 and the control valve 60. An aperture 142 allows pressure communication through chamber 144 and aperture 146 in the lifter body 52 to the pressurizable chamber 98. This results in a sliding movement of the power piston 96 to the left, as viewed in FIGURE 1, and also results in a sliding movement of the second piston 102 into the master cylinder 22 due to the engagement of the end 100 of the power piston 96 with the second piston 102.

Contemporaneous with the aforementioned pressurization of chamber 98 when chamber 136 is pressurized, a force is exerted on reaction piston 66 against the force of spring 70. As previously stated, the spring retainer 72 is carried by the valve actuator 18 so this pressure on the reaction piston 66 incorporates a "feel" into the system.

Upon a release of a force from the pedal 10, springs 104, 82, 74 and 70, compressed during the movements of the valving mechanism just described, return the associated portions of the mechanism to their static position wherein they are poised for another brake actuation.

When a pressure loss occurs in the mechanism, a different cycle takes place. When passage 124 is pressurized, a force is exerted against a fixed sleeve 88 and lifter body 52. This results in a compression of spring 110 in chamber 114 and the continual engagement of lifter body 52 with plug 92. Pressure from reservoir 32 normally is present in chamber 148 and in chamber 114. The pressure from reservoir 32 is communicated through a reservoir outlet 150 to chamber 152. Chamber 152 communicates with chamber 148 through aperture 154, chamber 155 and passage 157. Therefore, when pressure is relieved in chamber 120 and the piston 116 moves to the right, as viewed in FIGURE 1, fluid is present under low pressure behind the seated check valve 126. As previously stated, the lowering of pressure in passage 124 results in spring 110 becoming dominant, thereby driving the lifter body 52 to the right, as viewed in FIGURE 1, until it assumes the position shown in FIGURE 2.

Referring to FIGURE 2, it is seen that movement of the lifter body 52 enlarges the chamber 114 resulting in a lower pressure therein than is present in chamber 148. Therefore, fluid from chamber 148 unseats check valve 126 filling the void created in chamber 114 by the movement of lifter body 52. When the lifter 52 has completed its movement to the right, no differential exists across check valve 126 so it again seats, thereby sealing chamber 114. Thereafter, a force exerted on rod 14 is transmitted directly through valve actuator 18 and reaction piston 66 to the floating valve body 54 which bottoms against the compression of spring 82 on the lifter body 52. The lifter body 52 is separated from sleeve 88 and plug 92, carried by sleeve 88, only by the fluid stack in chamber 114. Therefore, movement of the push rod 14 is directly transmitted to the power piston 96 resulting in an immediate movement of second piston 102. Thereafter, the operation of the master cylinder 22 is in a conventional manner resulting in the application of vehicle brakes.

It should be noted that movement to the right, as viewed in FIGURE 1, of the lifter body 52 to the position shown in FIGURE 2 results in the rod 14 following this movement and pivoting the brake pedal 10 around the pivot 12 to a higher position relative to the toe board. Therefore, the subject invention combines the advantage of having a direct force transmission means operating through the trapped fluid to chamber 114 as well as positioning the brake pedal 10 at a point where it offers the greater travel and mechanical advantage for unpowered operation of the booster.

When pressure is relieved from the brake pedal 10 after having been actuated during unpowered operation, spring 104 drives the power piston 96 to the right, as viewed in FIGURE 2, transmitting force through the trapped fluid from chamber 114 to the associated valve mechanism, thereby raising the pedal 10 to a poised position which, of course, is higher than that available for powered operation of the booster.

When pressure is returned to the system, for example, by repairing line 36 or reaction of pump 34, the following sequence takes place. Pressure enters the inlet 40 unseating check valve 46. Pressure is then communicated through chamber 122 and aperture 123 into passage 124. The lifter body 52 is immediately moved toward the left, as viewed in FIGURE 1, until the lifter body 52 engages plug 92 decreasing the size of chamber 114. It should be noted that pressure simultaneously acts in chamber 120 against piston 116, thereby opening check valve 126. As chamber 114 decreases in size, the excess fluid situated therein is forced through passage 128 into chamber 148 and ultimately back through reservoir outlet 150 into reservoir 32 from whence it came. With spring 110 compressed and pressure present in chamber 130, the subject booster is again ready for powered operation.

The subject invention finds particular utility in the operative environment described in that a means is provided for positive force transmission in a power booster when pressure failure occurs in a supply thereto. In addition, a higher pedal is made available to the operator providing more pedal travel and a better force ratio for unpowered operation of vehicle brakes. Little lost motion is had between the master cylinder and the brake pedal resulting in a brake operation comparable to a system in which there is no booster. This is very significant in view of the fact that, on pedal raising mechanisms of common design associated with power boosters, some sacrifice in efficiency of braking is usually required when going from powered to unpowered operation thereof.

Another feature of particular utility is the incorporation of a master cylinder into a brake booster in a manner allowing the greater reservoir capacity of the power booster to be made available for operation of at least one power piston in the master cylinder. Internal pressure losses in the booster will not effect the unpowered operation of the subject device, and exterior leaks and failures automatically cause a check valve to isolate the fully enclosed booster body from the leaking portion of the system. Therefore, the subject invention provides a power brake system which utilizes a master cylinder capable of isolating portions of a braking system that develop leaks and become in operative as well as providing a powered and unpowered capability for either or both of the braking systems currently functioning.

It is understood that the valving mechanism operating the power portions of the booster can be of any well-known type which allow a passage containing fluid to be enlarged upon power failure to draw fluid from a reservoir, thereby providing a direct mechanical link which is necessitated by movement of a brake pedal to a higher position. Likewise, the hydraulic master cylinder shown herein is illustrative of a well-known type and the internal function thereof is considered a part of this invention only insofar as it cooperates with a reservoir common to a booster system.

While the embodiment of the present invention, as herein disclosed, constitutes a preferred form, it is to be understood that other forms might be adopted.

What is claimed is as follows:

1. Brake booster mechanism comprising: a fluid pressure source; a master cylinder adapted to transmit a force for actuation of vehicle brakes; a booster body including a reservoir for use by said master cylinder and being in fluid communication with said fluid pressure source; piston means engaging said master cylinder and being slidably disposed for translational movement in said booster body in response to pressure from said fluid pressure source; valve means slidably carried by said booster body and being responsive to a force from a brake pedal to selectively route pressure from said fluid pressure source to said piston means; and lifter means responsive to a loss of pressure from said fluid pressure source for trapping fluid between a movable slide in said booster body and said valve means during conditions of low pressure in said fluid pressure source thereby providing a movement of the brake pedal to a higher position than normal and providing a direct force transmitting means from the brake pedal to said master cylinder for brake actuation.

2. Brake booster mechanism comprising: an hydraulic master cylinder arranged to energize vehicle brakes; a booster body integrally formed with said hydraulic master cylinder, said booster body including a fluid reservoir adapted to provide fluid for operation of said hydraulic master cylinder and said booster body; a fluid pressure source connected in fluid communication with said booster body; piston means slidable in said booster body and including a portion slidable in said hydraulic master cylinder, said piston means being responsive to a pressure build-up on one side thereof for translational movement in said booster body to energize said master cylinder; valve means slidable in said booster body and arranged to selectively pressure one side of said piston means by routing pressure from said fluid pressure source in response to an input force acting thereon; and lifter means carrying said valve means and including a chamber formed between a slide movable in said booster body and said valve means for repositioning said valve means and trapping fluid therebetween thereby providing a direct force transmitting means from an input force to said piston means for unpowered operation of said hydraulic master cylinder under conditions of depressurization of said fluid pressure source.

3. Brake booster mechanism accordingly to claim 2 wherein the input force to said valve means is a brake pedal arranged to drive said valve means in a sliding manner in said booster body during powered operation and driving said slide in said booster body and said piston means through a fluid link during unpowered operation.

4. In combination, a dual hydraulic master cylinder adapted for the energization of vehicle brakes, and a power brake booster, said booster comprising: a fluid pressure source; a booster body integrally formed with said hydraulic master cylinder with at least one portion being in fluid communication with said fluid pressure source; a brake pedal pivotally supported by a vehicle and including an output member slidably disposed through one wall of said booster body; a power piston slidably disposed in a bore of said booster body, said power piston including an output piston arranged to pressurize a portion of said hydraulic master cylinder; a reservoir integrally formed with said booster body and arranged to supply fluid to a portion of said hydraulic master cylinder and to said fluid pressure source; valve means engaging said output member of the brake pedal and slidably disposed in said booster body, said valve means being positioned in cooperating relationship with said power piston to form a pressurizable chamber therebetween; and pedal raising means including a chamber formed between a slide movable in a bore of said booster body and said valve means, said chamber being in pressure communication with said fluid pressure source to provide a closed chamber containing fluid for direct force transmission from said brake pedal to said power piston under operating conditions when a pressure decrease below certain predetermined limits is experienced in said fluid pressure source, said pedal lifting means including slide valve means and a spring responsive to a loss of pressure in said fluid pressure source to reposition said valve means relative to said booster body thereby raising the brake pedal to provide a higher mechanical advantage for manual operation of the combination.

5. The combination according to claim 4 wherein said booster body includes a check valve responsive to a pressure loss in said fluid pressure source to prevent loss of fluid from said booster body.

6. The combination according to claim 4 wherein the pedal raising means includes a piston slidable in a bore of said valve means, said piston including means for closing off the chamber of said pedal raising means, said chamber housing spring means acting between said valve means and slide of said booster body to reposition said valve means in said booster body when pressure from said fluid pressure source decreases below certain predetermined limits thereby reversely moving said output member of the brake pedal to provide a higher brake pedal for unpowered operation of said brake booster.

7. The combination of a dual hydraulic master cylinder adapted to separately energize a series of vehicle brakes and a brake booster arranged to multiply an actuating force from a brake pedal to said hydraulic master cylinder, said hydraulic master cylinder having a first piston energizable by a second piston, said first piston being supplied fluid from a first reservoir; said brake booster comprising: a fluid pressure source; a booster body integrally formed with said hydraulic master cylinder and including an integrally formed second reservoir, said reservoir providing a source of fluid for the second piston of the hydraulic master cylinder and for said fluid pressure source; power piston means slidably disposed in said booster body and carrying the second piston of said hydraulic master cylinder; valve means slidably disposed in said booster body and positioned in said booster body relative to said power piston so as to form a pressurizable chamber therebetween; a brake pedal pivotally supported by a vehicle and including an output member engaging said valve means; and pedal raising means including a pressure responsive check valve, a chamber formed between said valve means and a portion of said booster body, and a spring compressible between a slide carrying said valve means in said booster body and said valve means, said brake pedal cooperating with said valve means to selectively route pressure to said pressurizable chamber on the force side of said power piston under normal operating conditions, the spring of said pedal raising means being compressed in the chamber of said pedal raising means under normal operating conditions, the chamber of said pedal raising means being isolatable by said check valve upon a pressure decrease in said fluid pressure source during which condition the compressed spring extends to move said valve means in a direction opposite to the normal direction for actuation thereby carrying the brake pedal to a higher position relative to said booster body, said chamber trapping fluid therein to provide a direct force transmission from said brake pedal through said valve means to said power piston to allow actuation of said hydraulic master cylinder without power from said brake booster with a higher mechanical advantage than normally available thereto.

8. The combination according to claim 7 wherein the booster body includes a check valve slidably disposed in one wall thereof, said check valve being responsive to a decrease in pressure in said fluid pressure source to prevent the egress of fluid contained in the booster body when the pressure loss occurs.

9. The combination according to claim 7 wherein the check valve of the pedal raising means includes a piston slidably disposed in a chamber communicating with inlet pressure and the chamber of the pedal raising means, said piston carrying a ball biased toward the inlet pressure and arranged to isolate the chamber of the pedal raising means when pressure to the booster body falls below certain predetermined limits.

10. The combination according to claim 7 wherein the power piston slidable in the booster body is piloted by engaging the second piston of said dual hydraulic master cylinder.

References Cited by the Examiner

UNITED STATES PATENTS

| | | | |
|---|---|---|---|
| 3,063,427 | 11/1962 | Hill | 60—54.6 X |
| 3,074,383 | 1/1963 | Schultz | 60—54.6 X |
| 3,093,120 | 6/1963 | Ayers | 60—54.6 X |
| 3,120,155 | 2/1964 | Ayers | 60—54.6 X |
| 3,120,156 | 2/1964 | Ayers | 60—54.6 X |
| 3,128,676 | 4/1964 | Ayers | 91—391 |
| 3,188,796 | 6/1965 | French et al. | 91—391 X |

MARTIN P. SCHWADRON, *Primary Examiner.*

ROBERT R. BUNEVICH, *Examiner.*